(12) United States Patent
Brennan et al.

(10) Patent No.: US 9,387,644 B1
(45) Date of Patent: Jul. 12, 2016

(54) BALLISTIC RESISTANT MATERIAL WITH NONORTHOGONAL STITCHING

(75) Inventors: Kelly Patrick Brennan, Sheridan, WY (US); Gwynedd Adelaide Thomas, Auburn, AL (US)

(73) Assignee: KENNON PRODUCTS, INC., Sheridan, WY (US)

( * ) Notice: Subject to any disclaimer, the term of this patent is extended or adjusted under 35 U.S.C. 154(b) by 832 days.

(21) Appl. No.: 13/446,605

(22) Filed: Apr. 13, 2012

Related U.S. Application Data

(60) Provisional application No. 61/475,738, filed on Apr. 15, 2011.

(51) Int. Cl.
*B32B 5/06* (2006.01)
*B32B 5/02* (2006.01)
*F41H 1/02* (2006.01)
(Continued)

(52) U.S. Cl.
CPC . *B32B 5/06* (2013.01); *A41D 31/00* (2013.01); *B32B 5/022* (2013.01); *B32B 5/024* (2013.01); *D05B 35/107* (2013.01); *F41H 1/02* (2013.01)

(58) Field of Classification Search
CPC .......... B32B 5/022; B32B 5/024; B32B 5/06; B32B 2250/05; B32B 2250/40; B32B 2250/42; B32B 2250/44; B32B 2307/581; A41D 31/00; A41D 2500/20; A41D 2500/30; F41H 1/02; D04B 1/10; D04B 1/102; D04B 1/06; D04B 1/08; D04B 9/26; D04B 9/38; D05B 35/107; D05B 21/007; D05B 2303/30; D05B 29/06; D05B 35/02

USPC ............ 2/2.5, 1; 28/116, 117, 120, 140, 143, 28/163, 164; 89/36.01, 36.02, 914; 428/98, 102, 103, 104, 109, 113, 428/195.1, 196, 197, 198, 911, 53, 54, 55, 428/56, 57, 58; 442/134, 135, 239, 240, 442/241, 255, 268, 270, 271, 243, 246, 442/245; 112/402, 117, 420, 415, 470.17
See application file for complete search history.

(56) References Cited

U.S. PATENT DOCUMENTS

| | | | | |
|---|---|---|---|---|
| 3,562,810 | A | * | 2/1971 | Davis ................................. 2/2.5 |
| 5,362,527 | A | * | 11/1994 | Harpell et al. .................. 428/33 |
| 5,736,474 | A | | 4/1998 | Thomas |

(Continued)

FOREIGN PATENT DOCUMENTS

| | | |
|---|---|---|
| CA | 2435804 | 8/2002 |
| IL | 126057 | 12/2002 |

(Continued)

OTHER PUBLICATIONS http://www.oxforddictionaries.com/us/definition/american_english/interlock Nov. 30, 2015.*

(Continued)

*Primary Examiner* — Arti Singh-Pandey
(74) *Attorney, Agent, or Firm* — Heslin Rothenberg Farley & Mesiti P.C.

(57) ABSTRACT

The present invention provides ballistic resistant armor including a first ballistic resistant layer including non-woven material, a second ballistic resistant layer comprising woven material, the first ballistic resistant layer coupled to the second ballistic resistant layer by stitches, and methods of making the same.

10 Claims, 9 Drawing Sheets

(51) Int. Cl.
A41D 31/00 (2006.01)
D05B 35/10 (2006.01)

(56) References Cited

U.S. PATENT DOCUMENTS

| | | | |
|---|---|---|---|
| 6,846,545 | B2 | 1/2005 | Thomas |
| 7,631,405 | B2 * | 12/2009 | Ritter et al. .............. 28/103 |
| 7,665,149 | B2 * | 2/2010 | Carbajal et al. .............. 2/2.5 |
| 7,700,503 | B2 | 4/2010 | Thomas, Jr. |
| 7,825,048 | B2 * | 11/2010 | Wang et al. .............. 442/135 |
| 8,015,617 | B1 * | 9/2011 | Carbajal et al. .............. 2/2.5 |
| 2003/0022583 | A1 | 1/2003 | Thomas et al. |
| 2012/0186006 | A1 * | 7/2012 | Chiou et al. .............. 2/463 |

FOREIGN PATENT DOCUMENTS

| | | |
|---|---|---|
| IL | 157030 | 9/2009 |
| WO | PCTUS9704816 | 10/1997 |
| WO | PCTUS0201803 | 8/2002 |
| WO | 2004020466 | 1/2005 |

OTHER PUBLICATIONS

H. Li, L. Rigs, G. Thomas, On Radiation Modes of Anisotropic Plain Weave Textile Antenna, 7th International Conference on Wireless Communications, Networking and Mobile Computing, Sep. 23-25, 2011, 4 pages, Wuhan, China, http://www.ieee.org/conferences_events/conferences/conferencedetails/index/hrml?Conf_ID=16733.

Houmin Li et al., Rapid Deployment Wireless Text Messaging Network for Disaster Relief, 3 pages, School of Information and Electronics, Beijing Institute of Technology, Sep. 23-25, 2011, http://www.ieee.org/conferences_events/conferences/conferencedetails/index.html?Conf_ID=16733.

Houmin Li et al., Geotextile-microstrip-hybrid Antennas for Roadbed Based Wireless Communication, Journal of the Textile Institute, , Department of Electrical and Computer Engineering, Auburn University, Auburn, VL, USA, Published online Apr. 18, 2012, pp. 1294-1303, http://dx.doi.org/10.1080/00405000.2012.677567.

H. L. Thomas, Non-woven Ballistic Composites, Chapter 9, Lightweight ballistic composites: Military and law-enforcement applications, Edited by A Bhatnagar, Woodhead Publishing, Feb. 13, 2008, pp. 240-271, Cambridge, UK.

G. A. Thomas, Non-woven Ballistic Composites, Military Textiles, Chapter 2, Edited by E. Wilusz, Auburn University, Feb. 13, 2008, pp. 17-49.

Howard L. Thomas, High Performance Fibers for Combat Threat and Damage Protection, High Performance Fibers Conference, Auburn University Polymer and Fiber Engineering, DARPA, Arlington, VA, Jun. 7, 2006, 22 pages.

Gwynedd A. Thomas, Principal Investigator, Air Warrior Upgrade Project, Plainsman Armor International, Body Armor Improvement Program, Phase 2, PM Air Warrior Office, Redstone Arsenal, Huntsville, AL, Nov. 24, 2003, 18 pages.

Howard L. Thomas et al., Trade and Development Trends in the U.S. Textile Industry, Dec. 2004, 16 pages, 15 Internationales Schlichterikolloquium, Denkendorf, Germany.

Howard L. Thomas, Geotextiles to Inhibit Insect Pest Colonies in Private and Commercial Residences, Auburn University Textile Engineering, Mar. 2000, 30 Pages, INDA Needlepunch Nonwovens Conference, Greenville, SC.

Sizing of Filament Yarns for Medical Implant Uses, Alabama Textile Manufacturers Association Slashing Short Course, Sep. 2009, 1-8 pages, Polymer and Fiber Engineering, Auburn University, Auburn, AL.

H.L. Thomas et al., Applying Surfactants/Salt Auxiliaries as Lubricating Agents in Warp Sizing, Department of Textile Engineering, Auburn University, Auburn, AL, 8 Pages, American Dyestuff Reporter, Aug. 1997, http://infohouse.p2ric.org/ref/02/01724.

H.L. Thomas, et al., Optimization of Preparation Procedures for Manufacturing of Vascular Implant Textiles Journal of Industrial Textiles, Jul. 1, 2001, vol. 31: pp. 57-73, http://jit/sagepub.com/content/31/1/57.

Houmin, Li et al., Development of Wireless Magnetoresistive Sensor Network for UXO and Landmine Detection, Sep. 23-35, 2011, 3 pages, School of Information and Electronics, Beijing Institute of Technology, Beijing, China, http://ieeexplore.ieee.org/xpl/login.jsp?tp=&arnumber=6040382&url=http%3A%2F%2Fieeexplore.ieee.org%2Fiel5%2F6036127%2F6036637%2F06040382.pdf%3Farnumber%3D6040382.

* cited by examiner

US 9,387,644 B1

BALLISTIC RESISTANT MATERIAL WITH NONORTHOGONAL STITCHING

GOVERNMENT RIGHTS STATEMENT

This invention was made with U.S. Government support under SBIR Topic N06-016 awarded by the United States Navy Naval Air System Command. The U.S. Government has certain rights in the invention.

TECHNICAL FIELD

The present invention generally relates to antiballistic protection. More particularly, the present invention relates to layered ballistic resistant armor.

BACKGROUND OF THE INVENTION

Vehicles operating in combat areas are vulnerable to damage or destruction as a result of damage caused by ballistic weaponry. Accordingly, several variants of armor have been developed in an effort to protect vehicles operating in dangerous areas.

Current vehicular armors tend to have one or more of the following problems: high weight per square inch, low ballistic protection ratings, or high cost. Heavy armors tend to lower the mobility of vehicles and/or increase fuel consumption. Armors with low ballistic protection ratings may be insufficient to prevent serious damage to the vehicle or personnel in the vehicle. Expensive armors may not be used widely or in desired amounts due to budgetary constraints.

Thus, a need exists for a relatively lightweight, low cost armor that affords a high level of significant ballistic protection.

SUMMARY OF THE INVENTION

In one aspect of the present invention, a ballistic resistant armor includes a first ballistic resistant layer including non-woven material, a second ballistic resistant layer comprising woven material, the first ballistic resistant layer coupled to the second ballistic resistant layer by stitches, wherein the stitches comprise a plurality of overlapping circles.

In another aspect of the present invention, a ballistic resistant armor includes a first ballistic resistant layer including non-woven material, a second ballistic resistant layer including woven material, the first ballistic resistant layer coupled to the second ballistic resistant layer by stitches, wherein the stitches comprise a plurality of discontinuous triangles.

In another aspect, the present invention a method of manufacturing a ballistic resistant armor is provided, the method including the steps of providing a first ballistic resistant layer including non-woven material, providing a second ballistic resistant layer including woven material, securing the first ballistic resistant layer to the second ballistic resistant layer using stitches, wherein the stitches comprise a plurality of overlapping circles.

In another aspect, the present invention provides a method of manufacturing a ballistic resistant armor, the method including the steps of providing a first ballistic resistant layer including non-woven material, providing a second ballistic resistant layer including woven material, securing the first ballistic resistant layer to the second ballistic resistant layer using stitches, wherein the stitches comprise a plurality of discontinuous triangles.

These, and other objects, features and advantages of this invention will become apparent from the following detailed description of the various aspects of the invention taken in conjunction with the accompanying drawings.

DETAILED DESCRIPTION OF THE INVENTION

Protection against ballistic weaponry is a continuing need for military and police forces, as well as for people needing to pass through or spend time in a potential combat zone. Most currently existing ballistic resistant materials, such as armor, are heavy, expensive, have a suboptimal protective rating, or all of the above. The present invention provides a new type of ballistic resistant material that is light weight, relatively inexpensive and provides a high level of ballistic resistance that may be tailored according to the specific ballistic threats expected in a particular situation.

In an aspect of the present invention, a ballistic resistant armor includes a first ballistic resistant layer including non-woven material, a second ballistic resistant layer including woven material, the first ballistic resistant layer coupled to the second ballistic resistant layer by stitches, wherein the stitches comprise a plurality of overlapping circles.

Figure 1:
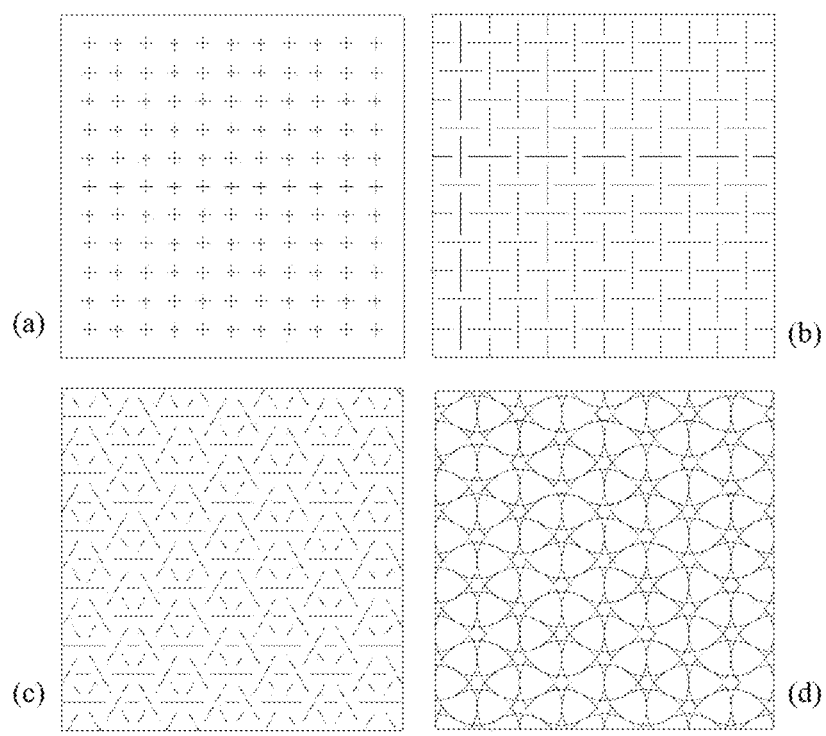
FIG. 1 (a)-(d) depicts several conceptual examples of stitching patterns that are in accordance with aspects of the present invention.

FIG. 1 shows several conceptual examples of the invention implementing varying stitch patterns through the woven and non-woven material. FIG. 1 (a) shows a material with the stitching in a series of "X-tacks", or "plus signs"; FIG. 1 (b) shows a material with the stitching in a series of square bar tacks, FIG. 1 (c) shows a material with the stitching in a series of discontinuous triangles, and FIG. 1 (d) shows a material with the stitching in a series of interlocking circles.

The non-woven material may be any material that is not composed of wound yarns of material with interlocked with warp and weft lines as its primary structure. Methods of creating non-woven material include, but are not limited to, mechanically interlocking fibers, such as in a felt material, for example, a needled felt; fusing fibers, such as when using thermoplastic fibers; or bonding fibers, such as with the use of an adhesive or cementing medium. Non-limiting examples of non-woven materials contemplated as within the scope of the invention include aramid and para-aramid fibers including KEVLAR® (poly-paraphenylene terephthalamide), DYNEEMA® (ultra-high-molecular-weight polyethylene), SPECTRA® (ultra-high-molecular-weight polyethylene), VECTRAN® (thermotropic liquid-crystal polymer), M5™ (PIPD) (Poly-hydroquinone-diimidazopyridine), and TWARON® (Poly-paraphenylene terephthalamide).

The fibers making up the non-woven material may vary according to desired denier sizes and fiber lengths, as desired or necessary for a particular use in accordance with aspects of the present invention.

The woven material may be any material that includes wound yarns of material, and has a primary structure including warp and weft lines of the yarn material. The yarns may be created using any suitable material, including staple fibers or filaments. Creation of the woven structure may be via any known method including, but not limited to one or a combination of the following: opening, carding, drawing, combing, roving, spinning, winding, warping, sizing and weaving.

The woven material may preferably be high occupation, high fabric density woven textiles at or near the jamming point of fabric construction. The fiber types for use in creating the yarn material may preferably be high modulus, high tensile strength materials including, for example, aramid and para-aramid fibers including KEVLAR® (poly-paraphenylene terephthalamide), DYNEEMA® (ultra-high-molecular-weight polyethylene), SPECTRA® (ultra-high-molecular-weight polyethylene), VECTRAN® (thermotropic liquid-crystal polymer), M5™ (PIPD) (Poly-hydroquinone-diimidazopyridine), and TWARON® (Poly-paraphenylene terephthalamide).

The woven layers may have any construction that is required or desired for a particular application. In addition to the material from which the woven layers are made, aspects of the woven layers that may be varied include, but are not limited to, the weave density and the linear mass density of the individual fibers. Exemplary weave densities for use within the scope of the present invention include weave densities of between about 15×15 to about 35×35. Exemplary linear mass densities of the individual fibers include between about 200 denier to about 2,000 denier, or about 600 denier to about 1,500 denier.

The material making up the stitches may be any application-appropriate material and may typically be a thread material. A non-limiting list of acceptable thread materials includes, for example, aramid and para-aramid fibers including KEVLAR® (poly-paraphenylene terephthalamide), DYNEEMA® (ultra-high-molecular-weight polyethylene), SPECTRA® (ultra-high-molecular-weight polyethylene), VECTRAN® (thermotropic liquid-crystal polymer), M5™ (PIPD) (Poly-hydroquinone-diimidazopyridine), and TWARON® (Poly-paraphenylene terephthalamide). While varying thread types are contemplated as within the scope of the invention, certain embodiments include a high-strength, continuous filament thread as the stitching material. The stitching material may be of different weights, lengths and/or thicknesses as appropriate or desired for a particular application.

The stitch density may vary according to aspects of the invention, with the specific stitch density being selected in an application-appropriate manner. Suitable stitch densities for use include, but are not limited to between about 3 stitches per inch to about 20 stitches per inch.

The stitching pattern may vary according to different aspects of the invention. FIG. 1 (a)-(d) show four different stitch patterns that are within the scope of the invention. FIG. 1(d) shows one embodiment of an interlocking circle pattern which has desirable properties for use as a ballistic resistant material. The interlocking circle pattern may vary in several ways, including diameter of the individual circles, the uniformity of circle sizes across the material, the spacing between the circles, and the eccentricity of the circles. The interlocking circles may also be applied in varying ways, for example, sets of hexagonally arranged circles.

In another aspect of the present invention provides a ballistic resistant armor includes a first ballistic resistant layer including non-woven material, a second ballistic resistant layer including woven material, the first ballistic resistant layer coupled to the second ballistic resistant layer by stitches, wherein the stitches comprise a plurality of discontinuous triangles.

This aspect of the invention may vary as described above for the aspects of the invention that include the interlocking circle stitch pattern and other examples described in this disclosure. For example, the acceptable materials for the woven and non-woven layers, the acceptable material for the stitching material, the arrangement of the layers and stitching material as well as the specific compositions of the woven and non-woven layers, along with the other parameters discussed in the context of the examples detailed in this disclosure may vary as described.

The specific configuration of the discontinuous triangle stitching may vary according to a desired or required application of aspects of the invention. Specifically, non-limiting examples of parameters that may vary within the scope of the present invention include the length of the stitch lines making up each discontinuous triangle and, the number and density of the discontinuous triangle stitches sewn into the material.

In another aspect of the present invention a method of manufacturing a ballistic resistant armor includes the steps of providing a first ballistic resistant layer including non-woven material, providing a second ballistic resistant layer including woven material, securing the first ballistic resistant layer to the second ballistic resistant layer using stitches, wherein the stitches comprise a plurality of overlapping circles.

The design, configuration, and composition of the woven and non-woven material layers may be as described elsewhere in this disclosure.

Securing the first ballistic resistant layer to the second ballistic resistant layer may occur according to any desired mechanism capable of forming stitches in the material including, for example, use of continuous filament thread materials. The stitches may be hand sewn or sewn with the use of appropriate machines or devices. In addition, multiple "stitch runs" may be made such that individual stitch runs penetrate different layers of the material. This may mean that multiple stitch runs are required in order for the entirety of the material to be secured.

In another aspect of the present invention a method of manufacturing a ballistic resistant armor includes the steps of providing a first ballistic resistant layer including non-woven material, providing a second ballistic resistant layer including woven material, securing the first ballistic resistant layer to the second ballistic resistant layer using stitches, wherein the stitches comprise a plurality of discontinuous triangles.

The design, configuration, and composition of the non-woven and woven material layers may be as described elsewhere in this disclosure.

Securing the first ballistic resistant layer to the second ballistic resistant layer may occur according to any desired mechanism capable of forming stitches in the material including, for example, use of continuous filament thread materials.

Examples

The following examples detail the design and testing of various aspects of the invention, here aspects for use as a ballistic resistant armor or insulation. For the purposes of these examples, 123 grain, 9 mm FMJ FIOCCHI™-brand ammunition was used as the ballistic threat and initial armor concepts were identified. The impact of varying stitch patterns on ballistic resistance was then tested. Individual aspects of armor design were isolated and subjected to ballistic testing. Analyses of test results were then used to identify probable ballistic defeat mechanisms, and to guide further testing. This process was repeated in parallel with a mass reduction regimen until armor performance satisfied threat level and areal density requirements.

As used in the following examples "down-selection" means identification of preferred armor designs for use and/or further testing. Armor down-selections were based on results from multiple rounds of ballistic trials. Following is a list of test groupings that were examined. Test data for these groups are included in the appendix.

Initial Material Survey—The beginning sample set consisted of 22 test coupons incorporating a wide array of reinforcement materials, fabric forms, layering arrangements, and areal densities. Observations from this group indicated the need for further study of reinforcement materials and stitch spacing. Additionally, the superior performance of felted non-woven ballistic protective fabrics (ARMORFELT™) to felted woven ballistic protective fabrics (CORE MATRIX™) was noted.

Direct Reinforcement Comparison—Focus of this group was on performance of reinforcement fibers in woven constructions. Four different fibers were tested in plain weave forms: SPECTRA® (style 904) (ultra-high-molecular-weight polyethylene), KEVLAR® (style 726, greige) (poly-paraphenylene terephthalamide), KEVLAR® (style 726, water repellant) (poly-paraphenylene terephthalamide), and TWARON® (style 5704) (Poly-paraphenylene terephthalamide). Tests showed superior performance from the para-aramids, especially greige KEVLAR® (style 726, greige) (poly-paraphenylene terephthalamide). Woven SPECTRA® (style 904) (ultra-high-molecular-weight polyethylene) was a notably poor performer.

Stitch Spacing—Spacing between continuous orthogonal stitch lines was investigated in this group. Spacings of 3 in., 2 in., 1 in. and 0.5 in. were used in these coupons. Results showed a clear trend of smaller spacing producing better results. It is assumed, although not yet verified, that there is an optimum spacing below which ballistic resistance decreases.

Figure 2:
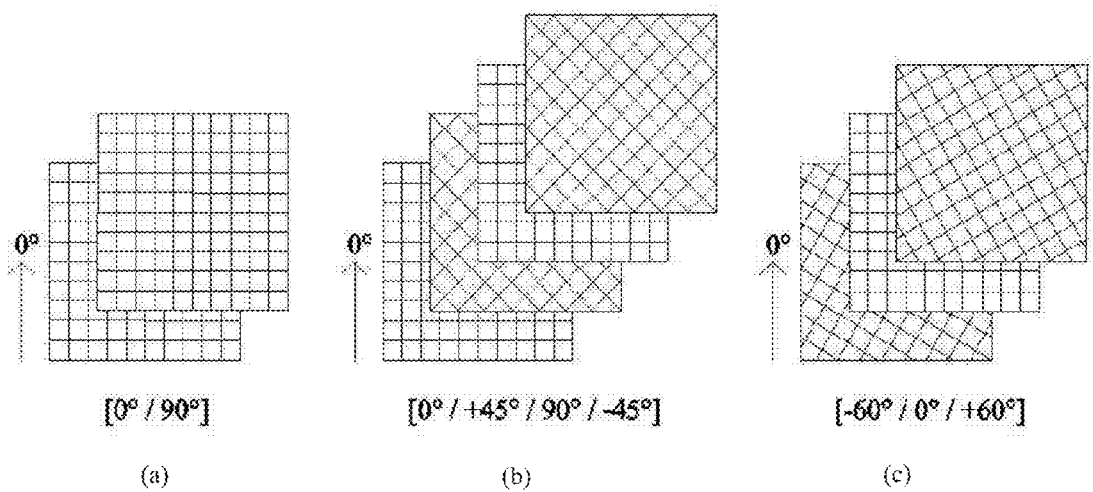
FIG. 2 (a)-(c) illustrates several potential arrangements of embodiments of the present invention including multiple woven layers.

Reinforcement Layup Angle—Inspection of previously tested armor coupons showed a tendency for damage to occur along lines parallel with the warp and weft fibers of the woven structure. This group investigated whether, or not, there was a benefit in having angular offsets between adjacent woven layers. Layups consisted of [0°/90°]$_6$ (typical aligned stacking of 12 plain weave layers), [0°/+45°/90°/−45°]$_3$, and [−60°/0°/+60°]$_4$. These arrangements are illustrated in FIG. 2. Ballistic test data showed that [0°/90°] constructions performed significantly better than those with angular offsets.

Figure 3:
FIG. 3 shows a photograph of several embodiments of the present invention with alternate stitch patterns.
Figure 4:
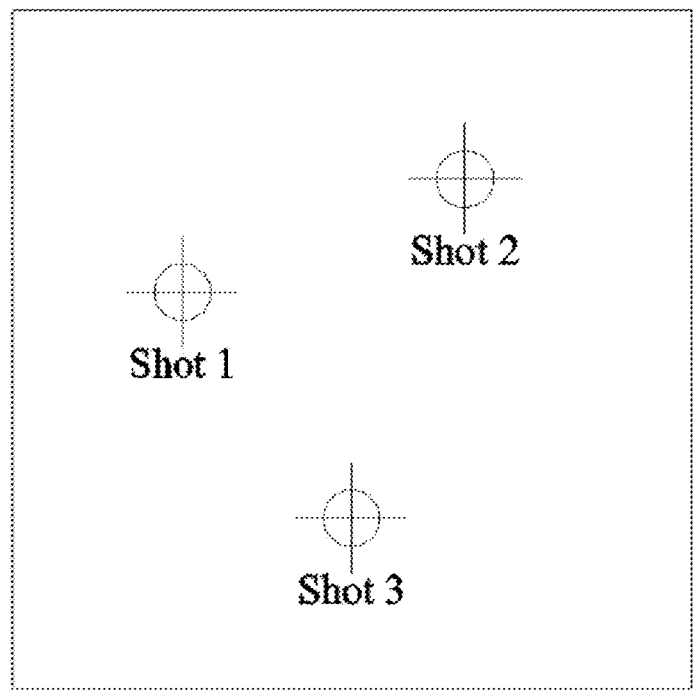
FIG. 4 depicts a drawing showing the approximate hit locations of three shots fired at embodiments of the present invention.
Figure 5:
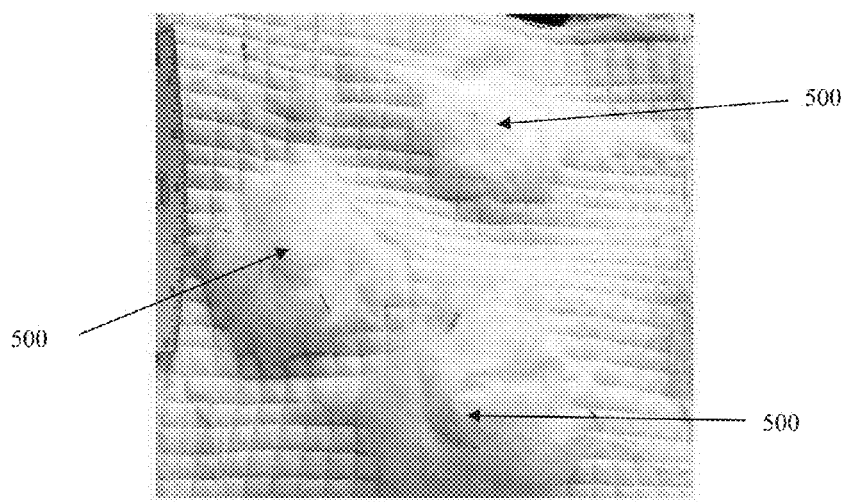
FIG. 5 depicts a photograph of an embodiment of the present invention showing bruising after ballistic testing.

Stitch Patterns—As mentioned previously, damage in armor coupons tended to follow along warp and weft lines. One way to reduce damage transmission was to locate stitches in directions other than those aligning with the fiber weave. Another was to isolate stitches from their neighbors. In total, this test group compared six different stitch patterns to see how various geometries isolated damage. A photograph of these different stitch layouts is shown in FIG. 3. During ballistic testing, a pattern was noticed whereby the majority of complete penetrations occurred during the second of three shots. The distribution of the three shots fired at each coupon is shown in FIG. 4 The one commonality among these failures was that the second shot was often located in, or near, the bruised area created by the first shot (as seen from the back of an armor coupon in FIG. 5). Designs that allowed easy spreading of bruise damage fared poorly in these tests.

Thread Material—Since thread material plays a major role in determining the performance of a stitch, this parameter was investigated as a way to minimize bruise growth through stitch failure. Four different thread types were compared: monofilament PTFE (TENARA®), continuous filament polyester (NU BOND™), and two weights of staple aramid (KEVLAR®). Experimental results were somewhat mixed, but did indicate that a high-strength, continuous filament thread would likely be a good choice for further testing.

Refined Stitch Geometry/Thread Material—Combining ideas from the previous two test groups, the final array of armor designs looked at maximizing stitch strength and isolating stitch damage. The first task was addressed by using a continuous filament aramid thread (KEVLAR®), and by employing redundant stitching (both multi-pass stitches and overlapping stitch zones). The second was addressed by using discontinuous, or locally continuous, stitch patterns, shown in FIG. 1. These approaches were very effective in drastically reducing bruise size. This, in turn, improved their ballistic resistance—especially in terms of multi-hit capability. The top two designs, a discontinuous triangular array (FIG. 1(c)) and an interlocked circular array (FIG. 1(d)), were then selected for further testing at an independent ballistic laboratory.

Test Methods

Each experimental armor coupon was tested according to the following protocols.

Coupon Geometry—Each coupon tested was nominally 12 in.×12 in.

Armor Backing—For down-selection ballistics testing, armor panels were hung in front of a pressed particle board backstop. V50 testing performed at an independent laboratory used an open-back frame with edge clamping for testing.

Firearm—All down-selection ballistic testing was performed using a High Point 995 TS 9 mm carbine with a 16.5 in. barrel.

Ammunition—For down-selection testing, 123 gr. 9 mm FMJ FIOCCHI™-brand ammunition was used. Chronograph testing indicated these rounds had an average muzzle velocity of 1,365 ft./s.

Standoffs—Each down-selection ballistic test was performed with approximately 20 ft. of standoff distance between the firearm muzzle and armor coupon.

Shot Patterns—Armor coupons were each shot three times. Shots were placed in the approximate locations shown in FIG. 4.

Analysis

Experimental data generated during and after each round of trials were analyzed to obtain pertinent information about armor coupon performance. Central to this investigation was the post-mortem inspection of all tested samples. These inspections would typically begin with an examination of back-face bruises and stitch destruction. Coupons were then dissected, and the number of layers penetrated by each bullet was recorded.

Initially, the analysis of bruise size was qualitative. Once it became apparent that this was a key indicator of armor performance, bruise measurement became quantitative. Each bruise was marked immediately after a coupon was shot, and the evolution and interaction of bruises were tracked as ballistic testing proceeded. During post-mortem analysis, bruise diameter was then measured and recorded.

Once all experimental data from a trial group were collected, they were used to compute rankings of the various coupons. These rankings were based on a composite score that was a function of areal density and effective mass, the latter being a measure of how much material was penetrated in each armor coupon. Later rankings also accounted for average bruise size.

Results from each round of testing were used to design subsequent armor coupons, and determine what design features would be examined in succeeding trials. This process continued until two satisfactory designs were developed. These constructions were then tested by an independent ballistics laboratory to determine the better design of the two.

Figure 6:
FIG. 6 shows a photograph of a deformed bullet that was fired at an embodiment of the present invention.

Throughout the course of testing, approximately one-half dozen different factors were observed in successful armor coupons. Foremost among these was bullet mushrooming (see FIG. 6). Areal spread and blunting of the bullet's tip helped to disperse pressure across a larger section of armor. The deformed bullet shape may have made it more difficult for the projectile to move fibers out of the way. This may have forced fibers to rupture instead, dissipating energy in the process.

Both high fiber strengths and fiber mobility contributed to maximum energy dissipation through rupture. As such, both of these characteristics were also common to successful armor coupons. It is important to note, however, that excessive fiber mobility was detrimental to armor performance. A balance was necessary between allowing fibers to deform under high loading, and preventing them from not fully engaging a projectile by moving out of its path.

Related to fiber mobility, armor integrity and bruise minimization were additional keys to armor success. Projectiles were far more likely to penetrate areas where armor constructions were not well consolidated. Since incoming projectiles tended to damage stitching in areas near the impact site, this bruising resulted in areas of localized material separation. An example of this bruising was shown in FIG. 5. Keeping the size of these bruises to a minimum reduced excess fiber mobility as well as lessened the likelihood that a subsequent bullet would impact a weakened area.

Figure 7:
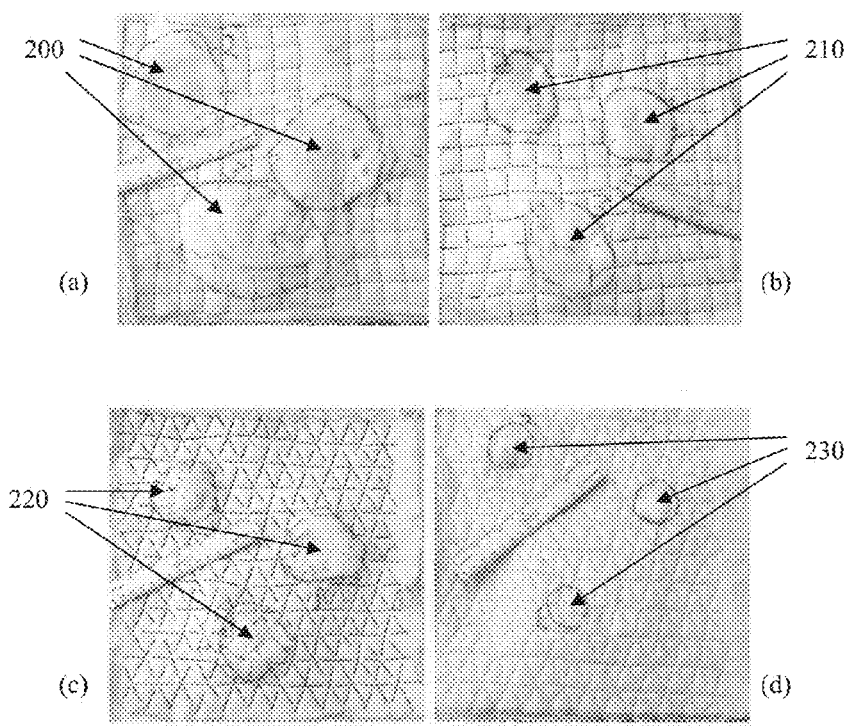
FIG. 7 (a)-(d) depicts photographs of embodiments of the present invention showing bruising after ballistic testing.

To maintain structural integrity and minimize bruising, it was important that stitches perform independently or in a redundant fashion. Traditional long-run stitching was particularly vulnerable to damage (see FIG. 7(a)). Projectiles often damaged entire stitches, affecting areas far from the impact site. By breaking up stitch runs, damage was limited to a local area, as seen in FIG. 7(b) in the form of smaller bruises of the material. Stitch redundancies helped by maintaining armor coherence after nearby stitching had been damaged. High-strength threads also aided in resisting layer separation (see FIG. 7(c) and (d)). FIG. 7(c) shows monofilament PTFE (Tenera) and FIG. 7(d) shows continuous filament aramid (Kevlar).

Figure 8:
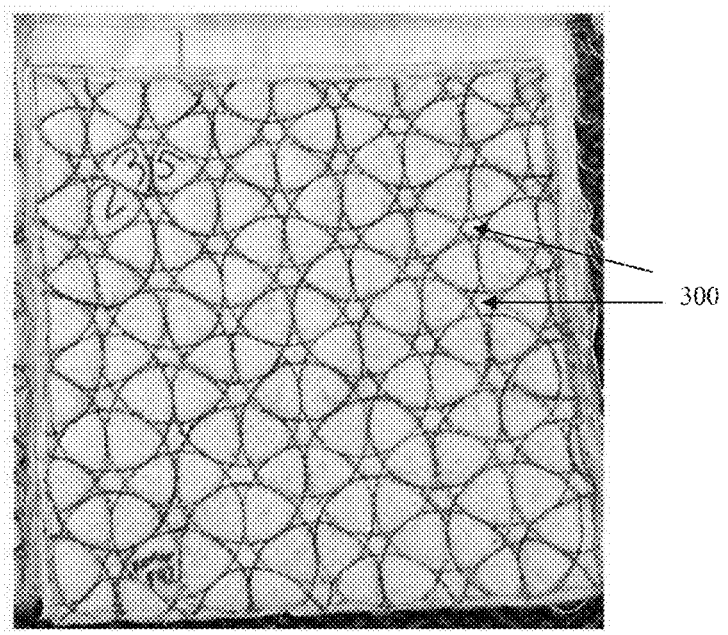
FIG. 8 is a photograph showing an embodiment of the present invention.
Figure 9:
FIG. 9 is a photograph showing several exemplary embodiments of the present invention encapsulated in an optional foam covering.

One embodiment of the present invention, here called Sidereax, was configured as a soft armor consisting of wovens and non-wovens stitched together in a specific pattern. The core of the armor consisted of 12 aligned layers of para-aramid plain weave fabric. Two layers of felted ballistic non-wovens were included on both sides of the woven core. These 16 fabric layers were stitched together with continuous filament para-aramid thread in an interlocking circle pattern based on 3 in. diameters (see Table 1 and FIG. 8). This construction may be encapsulated in aerospace-grade foam for environmental protection (e.g. ZOTEFOAMS ZOTEK™-brand F38 PVDF foam), as shown in FIG. 9.

TABLE 1

Materials used in Sidereax construction.

| Generic Material | Specific Material | Manufacturer/Supplier |
| --- | --- | --- |
| Woven fabric | Kevlar 129 (Style 726) | DuPont/JPS Composites |
| Non-woven fabric | Kevlar 129, Spectra 1000 ArmorFelt (Style 8238) | DuPont/Honeywell/ TexTech Industries |
| Para-aramid thread | Bonded Kevlar, Size 92 | DuPont/Thread Exchange |

Independent Verification of High Performance Samples

Following the experimental phase of armor development, an independent ballistics laboratory was employed to determine the V50 ratings of the top performing armor designs. Two 12 in.×12 in. samples each of an interlocked circle design, and a discontinuous triangle design (both shown in FIG. 1) were fabricated and delivered to Oregon Ballistic Laboratories on Nov. 19, 2010. V50 tests conforming to MIL-STD-662F were performed on all four armor coupons using 123 gr. 9 mm FMJ projectiles, and yielded results shown in Table 2.

TABLE 2

V50 test results.

| Armor Sample | V50 [ft/s] |
| --- | --- |
| Triangle 1 | 1402 |
| Triangle 2 | 1409 |
| Circle 1 | 1478 |
| Circle 2 | 1471 |

While the Sidereax embodiment has desirable ballistic resistance characteristics, this example is merely for illustrative purposes and should not be construed as limiting.

Aspects and embodiments of the present invention may have varying numbers of woven and non-woven material layers, for instance, a particular embodiment may have the following composition from one side of the ballistic resistant material to the other: two adjacent non-woven material layers disposed adjacent to twelve woven material layers disposed adjacent to two more adjacent non-woven material layers such as described for the Sidereax embodiment. Other aspects of the invention may alter the number of woven or non-woven layers, may include one or more non-woven layers between woven layers, or may have non-woven layers on only one side of the woven layers.

Another aspect of the invention that may vary according to certain embodiments is the specific configuration of the stitching material as related to the layers comprising a particular embodiment of aspects of the invention. According to certain embodiments, the stitching material will penetrate every layer of the ballistic resistant armor, while in other embodiments, only certain layers will be penetrated by the stitching material.

Without wishing to be held to a particular theory, the inventors note that damage to ballistic resistant armor tends to occur along warp and weft lines of a material and it may be that at least a portion of the superior performance characteristics of the present invention are due to the location of stitches in directions other than that of the fiber weave in certain embodiments and/or in isolating stitches from their neighbors in certain embodiments. Additionally, applying the stitch material in such a way as to make sure there are "redundant" stitches for a majority to all of the ballistic resistant material may be desired for certain aspects of the invention. For example, use of "redundant" stitching may result in the damage caused by failure of a stitch being confined to a very local region of the material. The way "redundancy" is achieved may vary, but non-limiting examples include: by varying the stitch density, by altering space between individual stitches, and by altering the shape of the stitches. It will be appreciated that any manner of applying the stitch material such that more than one stitch provides structural reinforcement to a particular area of the ballistic resistant material is contemplated as within the scope of the invention.

Optimal design for aspects of the invention will vary according to the application or ballistic threat for which the invention is being used. One example of this is in the case of an aspect of the invention wherein the stitching material forms an interlocking circular array. Determining the diameter of each circle and the space between stitches may require consideration of the primary ballistic threat expected to be encountered. As a non-limiting example, if 9 mm rounds are expected to be the primary ballistic threat encountered, using interlocking circles each having a diameter of three inches with one inch spaces between individual stitches may be desired or particularly preferred.

As used herein, the term "ballistic resistant" is used to indicate that the described material removes some amount of energy from a ballistic projectile when the projectile encounters the material. The term is not used herein to imply or designate a particular level of energy removed.

Aspects of the present invention may include components and materials other than woven layers, non-woven layers and stitching material. One exemplary material that may also be used is a foam material, such as an aerospace-grade foam material as shown in FIG. 9. Certain embodiments of the present invention that include use of this foam material may have the foam material on one or both sides of the ballistic resistant material of the present invention. According to certain embodiments, the armor may be pre-shaped, for example, during assembly, into a desired form and then encased in a foam. The foam material may be formed into a variety of shapes in conform to a desired configuration and/or shape. If an aspect of the present invention is used as a cabin liner in an aircraft, for example, the armor and foam may be configured such that the combined structure substantially conforms to the shape of the cabin of the aircraft.

Potential uses of aspects of the present invention are varied and diverse. Non-limiting examples include as a cabin liner for combat aircraft including planes and helicopters; as spall or shrapnel liners in engine nacelles, wheel wells and commercial cockpit doors; and as a lining material for dwellings or other structures.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A ballistic resistant armor comprising:
 a first ballistic resistant layer comprising non-woven material;
 a second ballistic resistant layer comprising woven material; said first ballistic resistant layer secured to said second ballistic resistant layer by stitches which traverse a majority of a surface of said woven material and create a pattern of a plurality of overlapping and intersecting circles, each of the plurality of circles comprises a perimeter, and the perimeter of at least one of the plurality of circles intersects with the perimeter of at least one other of the plurality of circles.

2. The ballistic resistant armor of claim 1, wherein said armor further comprises a third ballistic resistant layer comprising non-woven material that is disposed on the opposite side of said second ballistic resistant layer from said first ballistic resistant layer and wherein said third ballistic resistant layer is coupled to said first ballistic resistant layer and said second ballistic resistant layer by said stitches.

3. The ballistic resistant armor of claim 1, wherein the second ballistic resistant layer comprises a plurality of ballistic resistant layers comprising woven material.

4. The ballistic resistant armor of claim 3, further comprising at least one ballistic resistant layer comprising non-woven material disposed between at least two said ballistic resistant layers comprising woven material.

5. The ballistic resistant armor of claim 1, wherein said stitches further comprise a plurality of repeating geometric shapes that optimize fiber deformation.

6. The ballistic resistant armor of claim 1, wherein said stitches comprise three sets of hexagonally arranged circles such that individual circles are intersected by six other circles, wherein each of the six other circles comprises a center and the centers of each of the six other circles are arranged in a hexagon.

7. The ballistic resistant armor of claim 1, wherein the weave density of said woven layers is between about 15×15 and about 35×35.

8. The ballistic resistant armor of claim 1, wherein said woven layers comprise material that is between about 200 denier and about 2,000 denier.

9. A method of manufacturing a ballistic resistant armor, the method comprising:
 providing a first ballistic resistant layer comprising non-woven material;
 providing a second ballistic resistant layer comprising woven material;
 securing said first ballistic resistant layer to said second ballistic resistant layer by stitches which traverse a majority of a surface of said woven material and create a pattern of a plurality of overlapping and intersecting circles, each of the plurality of circles comprises a perimeter, and the perimeter of at least one of the plurality of circles intersects with the perimeter of at least one other of the plurality of circles.

10. The method of claim 9, the method further comprising providing a third ballistic resistant layer comprising non-woven material;
 disposing said third ballistic resistant layer on the opposite side of said second ballistic resistant layer from said first ballistic resistant layer; and
 securing said third ballistic resistant layer to said first ballistic resistant layer and said second ballistic resistant layer by said stitches.

\* \* \* \* \*